United States Patent [19]
Saperstein

[11] Patent Number: 4,877,083
[45] Date of Patent: Oct. 31, 1989

[54] BRAZED HEAT EXCHANGER AND METHOD OF MAKING THE SAME

[75] Inventor: Z. Philip Saperstein, Lake Bluff, Ill.

[73] Assignee: Modine Manufacturing Company, Racine, Wis.

[21] Appl. No.: 294,870

[22] Filed: Jan. 9, 1989

[51] Int. Cl.⁴ ................................................ F28D 1/02
[52] U.S. Cl. ..................................... 165/176; 138/94.3
[58] Field of Search ............... 165/174, 176; 138/94.3; 228/101, 183

[56] References Cited

U.S. PATENT DOCUMENTS 4,825,941  5/1989  Hoshino ........................... 165/176 X

*Primary Examiner*—Robert G. Nilson
*Attorney, Agent, or Firm*—Wood, Dalton, Phillips, Mason & Rowe

[57] ABSTRACT

Poor brazed joints in a heat exchange caused by improper venting during the brazing process are eliminated through the use of a baffle for disposition in a slot 32 in a tubular header 10, 12 which is formed of a plate-like metal piece having first and second peripheral sections 36, 40 of approximately the same extent. The first section 36 has a size at least as large as the outer dimension of the tubular header 10, 12 while the second section 40 has a size and shape approximately equal to a corresponding interior section of the tubular header 10, 12 and a notch 46 is disposed in the first section 36 and extends inwardly a distance 2t greater than the wall thickness t of the tubular header. The notch 46 provides a vent path during the brazing process which is subsequently filled by the capillary flow of molten braze metal 52 into the bottom 50 of the notch.

15 Claims, 2 Drawing Sheets

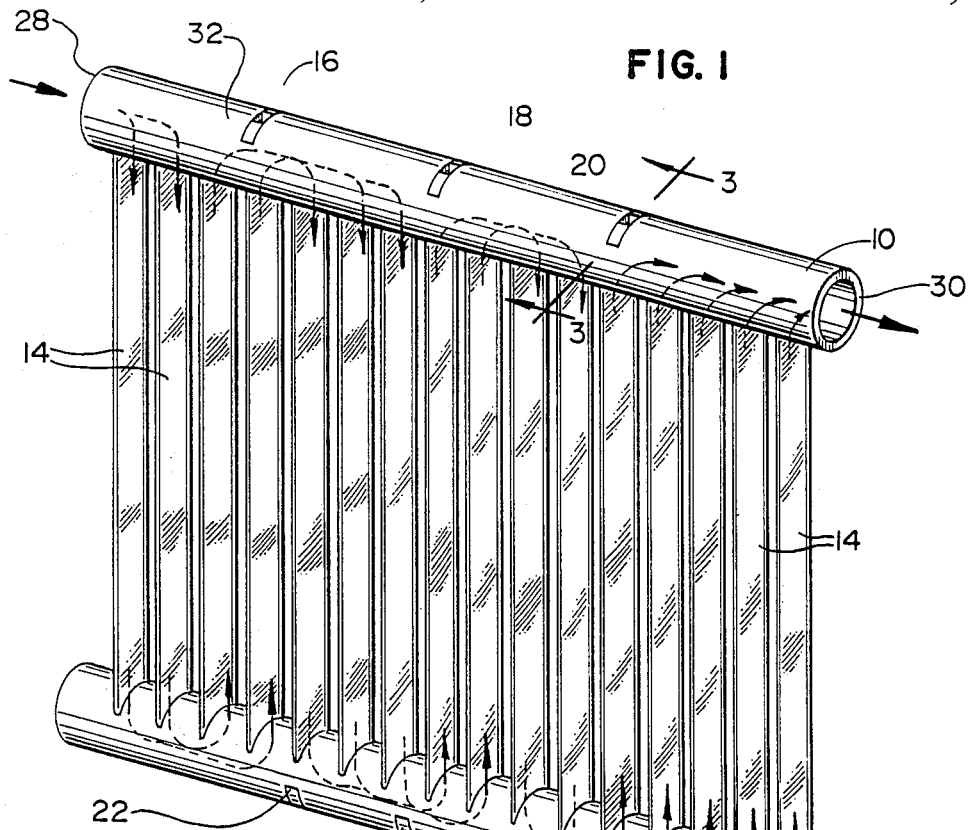
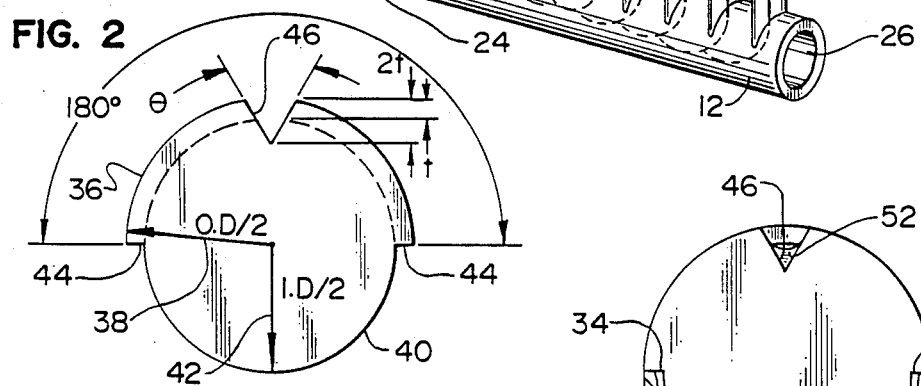
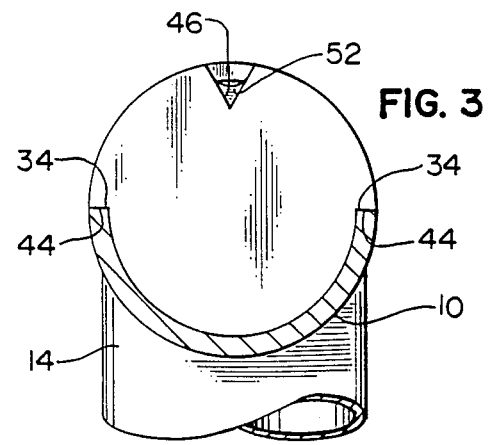
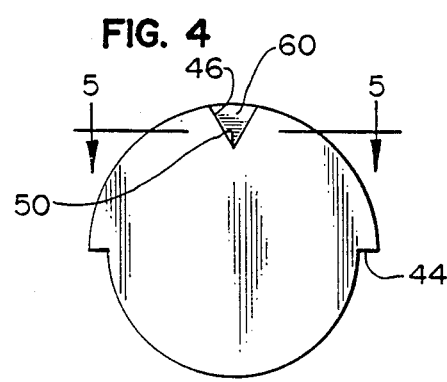
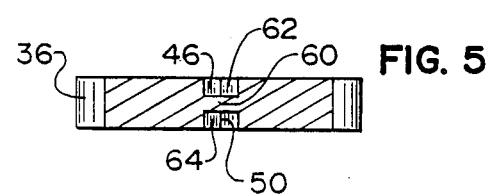

BRAZED HEAT EXCHANGER AND METHOD OF MAKING THE SAME

FIELD OF THE INVENTION

This invention relates to metal heat exchangers that are fabricated of components which are brazed together, such as aluminum heat exchangers, and methods of making such heat exchangers.

BACKGROUND OF THE INVENTION

Almost all heat exchangers made today are formed of metal since the excellent thermal conductivity associated with the commonly used metals as aluminum, copper, brass, etc. cannot be obtained with nonmetallic materials. As a consequence, such heat exchangers are commonly made up of several components which are held together through the use of mechanical fasteners and/or bonding techniques such as welding, brazing or soldering. Welding and brazing are favored over the use of solder, particularly where relatively higher pressure applications are concerned, because of the superior strength of the resulting bond, as well as other factors. As between welding and brazing, while welding may in many instances provide a bond whose strength is superior to a brazed bond, welding processes are not readily adaptable to heat exchangers employing tubular headers in many instances because of the relative inaccessibility of the tube-to-header joints to welding apparatus. Consequently, most heat exchangers employing tubular headers and requiring relatively strong joints are formed with a bonding process including brazing.

As is well known, in fabricating metal components of most any sort, including the tubes used in heat exchangers as well as in the process of forming tubular headers, various materials are brought into contact with the metal components being formed as they are being formed, most usually for lubrication purposes. Subsequently, in many instances, the formed components will be degreased using solvents or the like. Nonetheless, by the time the components have been assembled and are ready to be subjected to a brazing process, there typically will still remain some amount of residue from the lubricants and/or solvent. Upon the application of heat to raise the components to brazing temperature, the vaporization and/or decomposition of such residue, and possibly decomposition of fluxes used in the brazing process generate gases which in turn interfere with the flow of molten braze metal throughout the entirety of each joint to be brazed; and provision must be made to vent such gases.

In many instances, because the joints to be brazed will not be sealed, the gases may vent through such joints and after such venting, the braze metal will flow into the joint to ultimately seal the same. Difficulties have been experienced, however, where tubular headers are utilized in the heat exchanger and the tubular headers are provided with metallic baffles to provide multiple flow paths. The difficulty is accentuated as the number of baffles in a given header is increased.

The present invention is directed to overcoming one or more of the above problems.

SUMMARY OF THE INVENTION

It is the principal object of the invention to provide a new and improved brazed heat exchanger. It is also a principal object of the invention to provide a method of brazing a heat exchanger as well as to provide a metallic baffle for use with a tubular header of a heat exchanger.

According to one aspect of the invention, the above object is realized in a baffle construction for a tubular header which includes a plate-like metal piece having first and second peripheral sections of approximately the same extent. The first section has a size generally at least as large as the outer dimension of the tubular header while the second section has a size and shape approximately equal to a corresponding interior section of the tubular header. At least one notch is located in the first section and extends inwardly a distance greater than the wall thickness of the tubular header.

As a consequence of this construction, when the baffle is installed a tubular header and subjected to brazing heat, the notch provides a vent path for gases. This path subsequently fills with molten braze metal.

In a preferred embodiment, both of the sections are semicircular and of different radii.

In one embodiment of the invention, the notch is triangular in shape and the innermost part thereof acts as a capillary for molten braze metal.

According to another facet of the invention, the objects are realized in a heat exchanger that includes a pair of elongated, spaced, parallel generally cylindrical headers. A plurality of tubes extend between the headers and are in fluid communication with the interiors thereof. Slots are located in the headers generally transverse to the elongated dimension thereof and extend about half way through the corresponding headers. Baffles are brazed in the slots with each baffle having an interior semicircular shaped peripheral section sized to embrace the interior wall of the corresponding header and an exterior, semicircular shaped peripheral section of larger radius than the interior section. A notch is located in the exterior section and is of sufficient depth so as to extend inwardly of the interior wall. Braze metal fills at least that portion of the notch inwardly of the interior wall to seal the same. As before, the invention contemplates that the notch be sized and shaped so as to be a capillary to molten braze metal, although, in some instances, the notch may be sized to be closed by welding.

The invention contemplates that there generally, but not always, be at least two of the slots and baffles in at least one of the headers.

In one embodiment, the notch extends fully through the baffle while in another, it extends only partially through the baffle.

According to the invention, the exterior section has an arc length of at least about 180° and a radius approximately equal to that of the header.

According to still another facet of the invention, the above objects are realized in a method of brazing a metal baffle in a slot in a tubular metal header comprising the step of forming a capillary vent passage in the baffle with sufficient depth to establish a path of fluid communication in the baffle between the interior and the exterior of the header that is of sufficiently small size that molten braze metal will block the path after venting occurs.

A highly preferred method of forming a heat exchanger includes the steps of assembling the heat exchanger components, including at least one tubular header including at least one transverse slot, together; forming a baffle of a metal piece about the width of the slot so as to have an inwardly directed notch of sufficient depth as to have its end located inwardly of the interior surface of the tubular header; inserting a baffle in each such slot; applying a brazing flux; and heating the assembled components to a brazing temperature whereby vaporous materials resulting from the heating within the assembly may vent through said notches, whereafter molten braze metal may flow at least partially into said notch to block the same.

Other objects and advantages will become apparent from the following specification taken in connection with the accompanying drawings.

DESCRIPTION OF THE DRAWINGS

FIG. 1 is a perspective view of a heat exchanger embodying the invention;

FIG. 2 is an elevational view of a baffle employed in the heat exchanger;

FIG. 3 is a sectional view taken approximately along the line 3—3 in FIG. 1;

FIG. 4 is an elevational view of a modified embodiment of the baffle;

FIG. 5 is an enlarged sectional view taken approximately along the line 5—5 in FIG. 4.

DESCRIPTION OF THE PREFERRED EMBODIMENTS

Figure 6:
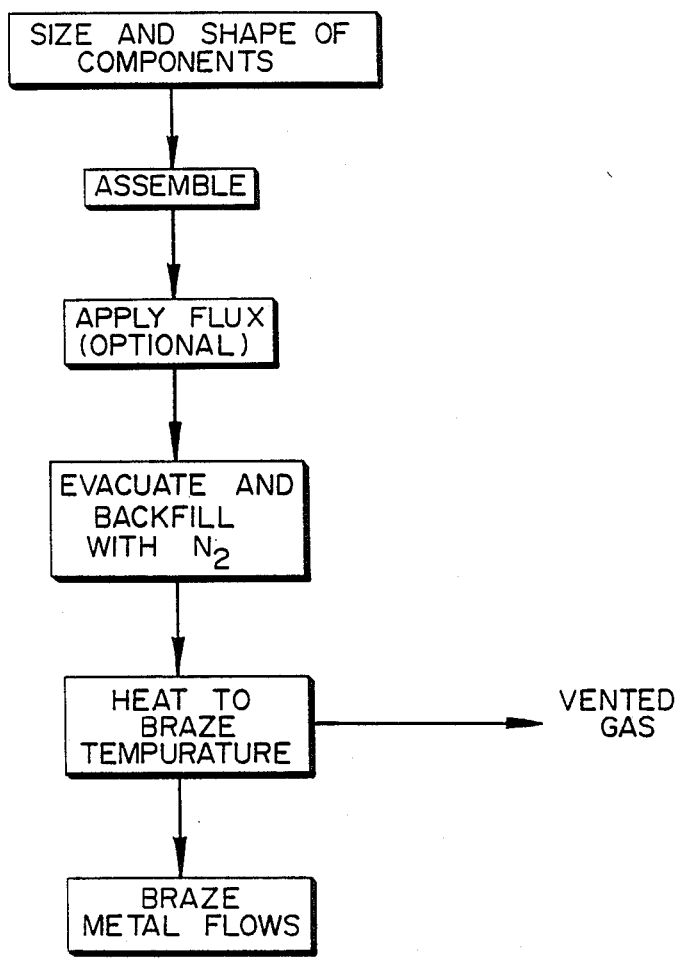
FIG. 6 is a block diagram of the steps in a method of making a heat exchanger.

An exemplary embodiment of a heat exchanger made according to the invention is illustrated in FIG. 1 and is seen to include elongated, generally cylindrical, spaced, parallel headers 10 and 12. Typically, but not always, the headers 10 and 12 will be formed of aluminum tubing.

Extending between the headers 10 and 12 and in fluid communication with the interiors thereof are a plurality of flattened tubes 14. The flattened tubes 14 will typically be made of aluminum as well.

In the illustrated embodiment, three baffles are located in the upper header 10 at locations designated 16, 18, and 20 while two baffles are disposed in the lower head 12 at the locations designated 22 and 24. In addition, the ends of the lower header 12 are sealed as with end caps 26. One end 28 of the upper header 10 serves as an inlet for a heat exchange fluid while the opposite end 30 may serve as an outlet.

As a consequence of the foregoing construction, the heat exchange fluid entering the inlet 28 will be diverted through less than all of the tubes 14 by the baffle at the location 16 to the lower header 12. At this point, the baffle at the location 22, being staggered from the position of the baffle 16, will direct the heat exchange fluid upwardly to return to the upper header 10.

This action will occur at each of the baffle locations as indicated by the various arrows in FIG. 1 and it will be appreciated that a multiple pass heat exchanger is provided, in the exemplary embodiment, a five pass heat exchanger.

As is well known, various fins, most usually serpentine fins (not shown) are disposed between adjacent ones of the flattened tubes 14.

At each of the baffle locations 16, 18, 20, 22 and 24, a slot 32 is cut at least half way through the corresponding one of the headers 10 or 12 in a direction generally transverse to the elongated dimension of the corresponding header 10 or 12. The sides of the slot are shown at 34 in FIG. 3. According to the invention, installed in each slot 32 is a baffle of the construction illustrated in FIG. 2. Such a baffle is typically a piece metal of uniform thickness, that is, plate-like, and the thickness will be slightly less than the width of the slots 32. Each baffle has a first or exterior peripheral section 36 which is typically semicircular having a radius indicated by the arrow 38 which in turn is equal to the half of the outer diameter of the corresponding header 10 or 12. As illustrated in FIG. 2, the arc length of the section 36 is at least about 180°.

The remainder of the periphery of the baffle is a second semicircular section 40 having a lesser radius shown by the arrow 42 which in turn is equal to one-half of the inner diameter of the corresponding header 10 or 12. The sections 36 and 40 are joined by shoulders 44 which are adapted to abut the sides 34 of the slots 32 as can be seen in FIG. 3.

The baffle is completed by an inwardly directed notch 46. It is illustrated in FIG. 2, the notch 46 is triangular, the sides having an included angle of $\theta$. In one embodiment of the invention, the value of $\theta$ is approximately 30°.

As can be seen, the depth of the notch 46 is 2t, t being the tube wall thickness of the corresponding header 10 or 12. In one embodiment of the invention, where t has a value of 0.060 inches, the depth of the notch will be 0.120 inches.

Typically, the various components will be clad with braze metal and in a preferred embodiment, will be brazed together using the aluminum brazing process licensed under the registered trademark "NOCOLOK" using known fluxes that are potassium fluoro aluminates. In such a case, using the foregoing dimension for header wall thickness and angle and configuration of the notch 46, at least the lower end 50 of the notch will act as a capillary for molten braze metal such that braze metal will flow into the notch 46 and fill that part of it that extends inwardly of the inner wall of the corresponding header 10 or 12 as shown at 52 in FIG. 3 thus sealing off the remainder of the notch 46 from the interior of the corresponding header 10 or 12. However, other dimensions relative to the notch angle, depth, shape and the like may be used depending upon variables such as header tube diameter, braze clad ratio, tube gauge, the type of brazing cycle employed and length thereof, etc.

An alternative embodiment of a baffle made according to the invention is illustrated in FIGS. 4 and 5. Where like components are the same, like reference numerals have been utilized. In the embodiment illustrated in FIGS. 4 and 5, the notch 46 does not extend completely through the baffle 36 as does the notch 46 in the embodiments of FIGS. 2 and 3. Rather, a thin web 60 extends across the notch to define opposed notch segments 62 and 64, one on each side of the baffle 36. This allows venting from both sides of the baffle and provides the web of material 60 to enhance the subsequent brazed or weld closure. In this case, the notch segments 62 and 64 may serve as defined leaks which fill with braze metal by capillary action or, if desired, may be filled by a subsequent welding operation.

The manner in which the heat exchanger is manufactured is diagrammatically shown in FIG. 6 and is as follows. Firstly, the various components including the headers 10 and 12 and the tubes 14 as well as the baffles are sized and shaped and otherwise formed of metal that is clad with braze metal. The components are then assembled together and held in assembled condition through the use of fixtures as is well known. At this time, the flux will be applied to the components as by spraying. Where flux is applied to the interior of the headers 10 and 12, such application may be by spraying prior to the insertion of the end caps 26 and the baffles in the slots 32. Alternatively, the flux may be applied before the assembly process. Generally, however, it is preferred to apply flux after assembly since the assembly process may dislodge a certain amount of the flux which may then result in poor bonds.

After the flux has been applied, the assembled heat exchanger is placed in a brazing oven. The components are then purged and filled with an inert gas such as molecular nitrogen. Thereafter, the assembly is elevated to a temperature above the flow temperature of the braze metal but below the melting point of the base metal. As this occurs, gas generated by vaporization and/or decomposition of processing residues and/or flux and/or desorption of surface moisture including water of hydration of salts on the surface will vent in the usual fashion at the various joints. It will also vent via the notches 46 in the baffles since the inner ends of the notches 50 are fluid communication with the interior of each of the headers 10 and 12 by reason of their extending inwardly of the interior walls thereof. After the venting has occurred, there is no impediment to the wetting of the various surfaces by the now molten braze metal which then flows to join the components together and seal their various interfaces. By reason of the formation of the notch 46 as described before, it acts as a capillary to molten braze metal with the result of that the body 52 of braze metal shown in FIG. 3 forms at the bottom of the notch 50 and is of sufficient size to close the notch from the interior of the corresponding header 10 or 12.

The foregoing method as described is a preferred embodiment of the invention. However, it is to be expressly understood that the brazing process may be a vacuum brazing process in which case flux need not be applied to the assembly. That is, the flux application step illustrated in FIG. 6 is unnecessary when a vacuum brazing operation is employed. In this case, the notches in the baffles also benefit the degassing or venting that will occur during the vacuum brazing process.

Thus, the invention provides a means whereby high quality braze joints between baffles and tubular headers may be obtained without fear of defects as a result of improper venting during the brazing process.

I claim:

1. A baffle for a tubular header comprising a plate like metal piece having first and second peripheral sections of approximately the same extent, the first section having a size generally at least a large as the outer dimension of the tubular header, the second section having a size and shape approximately equal to a corresponding interior section of the tubular header, and a notch in said first section extending inwardly a distance greater than the wall thickness of the tubular header.

2. The baffle of claim 1 wherein both of said sections are semicircular and of different radii.

3. The baffle of claim 1 wherein said notch is triangular in shape.

4. The baffle of claim 1 wherein said notch extends through said baffle.

5. The baffle of claim 1 wherein said notch extends only partially through said baffle.

6. The baffle of claim 1 wherein a web extends across said notch.

7. A heat exchanger comprising:
a pair of elongated spaced, parallel generally cylindrical headers;
a plurality of tubes extending between said headers and in fluid communication with the interior thereof;
slots in said headers generally transverse to the elongated dimension of said headers and extending at least about half way through the corresponding header;
baffles brazed in said slots, each baffle having an interior semicircular shaped peripheral section sized to embrace the interior wall of the corresponding header and an exterior, semicircular shaped peripheral section of larger radius than said interior section, and a notch in said exterior section of sufficient depth as to extend inwardly of said interior wall; and
braze metal filling at least that portion of said notch inwardly of said interior wall.

8. The heat exchanger of claim 7 wherein part of said notch is sized and shaped to be a capillary to molten braze metal.

9. The heat exchanger of claim 8 wherein there are at least two of said slots and baffles in at least one of said headers.

10. The heat exchanger of claim 9 wherein said exterior section has an arc length of at least about 180° and a radius approximately equal to that of the header.

11. A method of brazing a metal baffle in a slot in a tubular metal header comprising the step of forming a capillary vent passage in the baffle with sufficient depth to establish a path of fluid communication in the baffle between the interior and the exterior of the header that is sufficiently small in size that molten braze metal will block the path.

12. A method of fabricating a heat exchanger formed of metal parts with brazed metal cladding comprising the steps of:
assembling the heat exchanger components, including at least one tubular header having at least one transverse slot, together;
forming a baffle of a metal piece about the width of the slot so as to have an inwardly directed notch of sufficient depth as to have its end located inwardly of the interior surface of the tubular header;
inserting a baffle in each said slot; and heating the assembled components to a brazing temperature whereby vaporous materials resulting from the heating within the assembly may vent through said notches, whereafter molten braze metal may flow at least partially into said notch to block the same.

13. The method of claim 12 wherein a step of applying flux is included as part of assembling the components together.

14. The method of claims 12 wherein the step of heating is preceded by the step of purging the heat exchanger and filling the same with an inert gas.

15. The method of claim 14 wherein the inert gas is nitrogen.

* * * * *